(12) United States Patent
Howe et al.

(10) Patent No.: US 7,326,148 B2
(45) Date of Patent: Feb. 5, 2008

(54) CONTROL SYSTEM FOR ELECTRONIC ACTUATED SHIFTER

(75) Inventors: Brian Douglas Howe, Shelby Township, MI (US); Charles Lee Flynn, Davisburg, MI (US); Mohit Singhal, Comstock Park, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 157 days.

(21) Appl. No.: 11/074,965

(22) Filed: Mar. 8, 2005

(65) Prior Publication Data
US 2006/0205562 A1    Sep. 14, 2006

(51) Int. Cl.
*B60W 10/00* (2006.01)
(52) U.S. Cl. ...................... 477/96; 192/220.4
(58) Field of Classification Search ................... 477/96; 192/220.2–220.7

See application file for complete search history.

(56) References Cited

U.S. PATENT DOCUMENTS 5,220,984 A * 6/1993 Ruiter ...................... 192/220.4
2002/0166400 A1* 11/2002 Syamoto et al. ......... 74/473.21

* cited by examiner

*Primary Examiner*—Richard M. Lorence
*Assistant Examiner*—Edwin A Young
(74) *Attorney, Agent, or Firm*—Richard M. Mescher; Porter, Wright; Dean B. Watson

(57) ABSTRACT

A shifter mechanism for a motor vehicle includes a shifter lever, a park switch indicating when the shifter lever is out of a park position, and an electric actuator movable between a locking position and an unlocking position to lock and unlock the lever. An interlock switch indicates when the vehicle operator desires to move the lever. A controller moves the actuator when an ignition switch indicates an ignition is on, a brake switch indicates a brake pedal is pressed, and the interlock switch is actuated. The controller also moves the actuator when the lever is not in the park position and the interlock switch is actuated. The controller actuates a vehicle key lock actuator when the ignition switch indicates the vehicle ignition is on or when the park switch indicates that the lever is not in the park position.

18 Claims, 4 Drawing Sheets

| INPUTS | | | | OUTPUT | |
|---|---|---|---|---|---|
| PARK SW | IGN | BRAKE | INTERLOCK | KEYLOCK | SOLENOID |
| OFF | OFF | OFF | OFF | OFF | OFF |
| OFF | OFF | OFF | ON | OFF | OFF |
| OFF | OFF | ON | OFF | OFF | OFF |
| OFF | OFF | ON | ON | OFF | OFF |
| OFF | ON | OFF | OFF | ON | OFF |
| OFF | ON | OFF | ON | ON | OFF |
| OFF | ON | ON | OFF | ON | OFF |
| OFF | ON | ON | ON | ON | ON |
| ON | OFF | OFF | OFF | ON | OFF |
| ON | OFF | OFF | ON | ON | ON |
| ON | OFF | ON | OFF | ON | OFF |
| ON | OFF | ON | ON | ON | ON |
| ON | ON | OFF | OFF | ON | OFF |
| ON | ON | OFF | ON | ON | ON |
| ON | ON | ON | OFF | ON | OFF |
| ON | ON | ON | ON | ON | ON |

CONTROL SYSTEM FOR ELECTRONIC ACTUATED SHIFTER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a shifter mechanism for controlling transmissions of motor vehicles and, more particularly, to a control system for a shifter mechanism having an electronic actuated solenoid assembly for holding a shifter lever in a desired gear position against inadvertent movement to other gear positions.

BACKGROUND OF THE INVENTION

In a motor vehicle, a shifter lever of a shifter mechanism is typically pivotable over a series of positions representative of desired transmission gears such as, for example, park (P), reverse (R), neutral (N), drive (D), and low gear (M). The shifter mechanism is connected to the motor vehicle automatic transmission by a suitable mechanical and/or electronic operating linkage to effect actuation of the transmission to the selected gear when the shifter lever is pivoted to the transmission gear's representative position. The shifter mechanism is typically provided with a detent assembly which releasably holds the shifter lever mechanism in a desired position to prevent inadvertent movement to other positions but permits desired movement to other positions. The detent assembly typically includes a mechanical actuator which is manually operated to release the detent assembly and permit manual pivoting of the shifter lever mechanism to a new position.

Attempts have been made to replace the mechanical actuator with an electronic actuator. For example, see U.S. Pat. No. 5,220,984, the disclosure of which is expressly incorporated herein in its entirety by reference. This shifter mechanism attempts to simplify construction by providing an electrically actuated detent assembly having a locking pawl moved by an electric solenoid.

While these prior electronic shifter mechanisms eliminate the need for mechanical actuators, they are relatively complex and expensive to implement. Vehicle electronics must be adapted to determine when shifting gears is permissible so that gears are not switched under inappropriate conditions. Additionally, the shifter mechanism requires cables to receive signals from the brake pedal and the key lock in order to determine vehicle conditions. Both of which drive up the cost and complexity of the vehicle. Accordingly, there is a need in the art for an improved electronic shifter mechanism.

SUMMARY OF THE INVENTION

The present invention provides an electronic shifter mechanism which overcomes at least some of the above-noted problems of the related art. According to the present invention, a shifter mechanism for a motor vehicle comprises, in combination, a shifter lever movable along a shift path between a plurality of gear positions including a park position, a park switch providing a signal indicating when the shifter lever is out of the park position, and a lock assembly including an electric actuator movable between a locking position wherein the shifter lever is locked in one of the plurality of gear positions and an unlocking position wherein the shifter lever is movable along the shift path between the plurality of gear positions. A manually-actuated interlock switch provides a signal indicating the vehicle operator desires to move the shifter lever between the plurality of gear positions. A controller is operably connected to the park switch to receive the signal from the park switch, operably connected to the interlock switch to receive the signal from the interlock switch, and operably connected to the electric actuator to selectively actuate the electric actuator. The controller is adapted to receive an input signal from a vehicle ignition switch indicating whether a vehicle ignition is on and an input signal from a vehicle brake switch indicating whether a vehicle brake pedal is pressed. The controller moves the actuator to the unlocking position when the input signal from the vehicle ignition switch indicates the vehicle ignition is on, the input signal from the vehicle brake switch indicates that the vehicle brake pedal is pressed, and the signal from the interlock switch indicates that the vehicle operator has actuated the interlock switch. The controller also moves the actuator to the unlocking position when the signal from the park switch indicates that the shifter lever is not in the park position and the input signal from the interlock switch indicates that the vehicle operator has actuated the interlock switch.

According to another aspect of the present invention, a shifter mechanism for a motor vehicle comprises, in combination, a shifter lever movable along a shift path between a plurality of gear positions including a park position, a park switch providing a signal indicating when the shifter lever is out of the park position, and a lock assembly including an electric actuator movable between a locking position wherein the shifter lever is locked in one of the plurality of gear positions and an unlocking position wherein the shifter lever is movable along the shift path between the plurality of gear positions. A manually-actuated interlock switch provides a signal indicating the vehicle operator desires to move the shifter lever between the plurality of gear positions. A controller is operably connected to the park switch to receive the signal from the park switch, operably connected to the interlock switch to receive the signal from the interlock switch, and operably connected to the electric actuator to selectively actuate the electric actuator. The controller is adapted to receive an input signal from a vehicle ignition switch indicating whether a vehicle ignition is on. The controller actuates a vehicle key lock actuator when the input signal from the vehicle ignition switch indicates the vehicle ignition is on. The controller also actuates the vehicle key lock actuator when the signal from the park switch indicates that the shifter lever is not in the park position.

According to yet another aspect of the present invention, a shifter mechanism for a motor vehicle comprises, in combination, a shifter lever movable along a shift path between a plurality of gear positions including a park position, a park switch providing a signal indicating when the shifter lever is out of the park position, and a lock assembly including an electric actuator movable between a locking position wherein the shifter lever is locked in one of the plurality of gear positions and an unlocking position wherein the shifter lever is movable along the shift path between the plurality of gear positions. A manually-actuated interlock switch provides a signal indicating the vehicle operator desires to move the shifter lever between the plurality of gear positions. A controller is operably connected to the park switch to receive the signal from the park switch, operably connected to the interlock switch to receive the signal from the interlock switch, and operably connected to the electric actuator to selectively actuate the electric actuator. The controller is adapted to receive an input signal from a vehicle ignition switch indicating whether a vehicle ignition is on and an input signal from a vehicle brake switch indicating whether a vehicle brake pedal is pressed. The controller moves the actuator to the unlocking position when the input signal from the vehicle ignition switch indicates the vehicle ignition is on, the input signal from the vehicle brake switch indicates that the vehicle brake pedal is pressed, and the signal from the interlock switch indicates that the vehicle operator has actuated the interlock switch. The controller also moves the actuator to the unlocking position when the signal from the park switch indicates that the shifter lever is not in the park position and the input signal from the interlock switch indicates that the vehicle operator has actuated the interlock switch. The controller actuates a vehicle key lock actuator when the input signal from the vehicle ignition switch indicates the vehicle ignition is on, and the controller actuates the vehicle key lock actuator when the signal from the park switch indicates that the shifter lever is not in the park position. The controller includes all control circuits used to control both the electric actuator and the vehicle key lock actuator.

From the foregoing disclosure and the following more detailed description of various preferred embodiments it will be apparent to those skilled in the art that the present invention provides a significant advance in the technology and art of motor vehicle shifter mechanisms. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
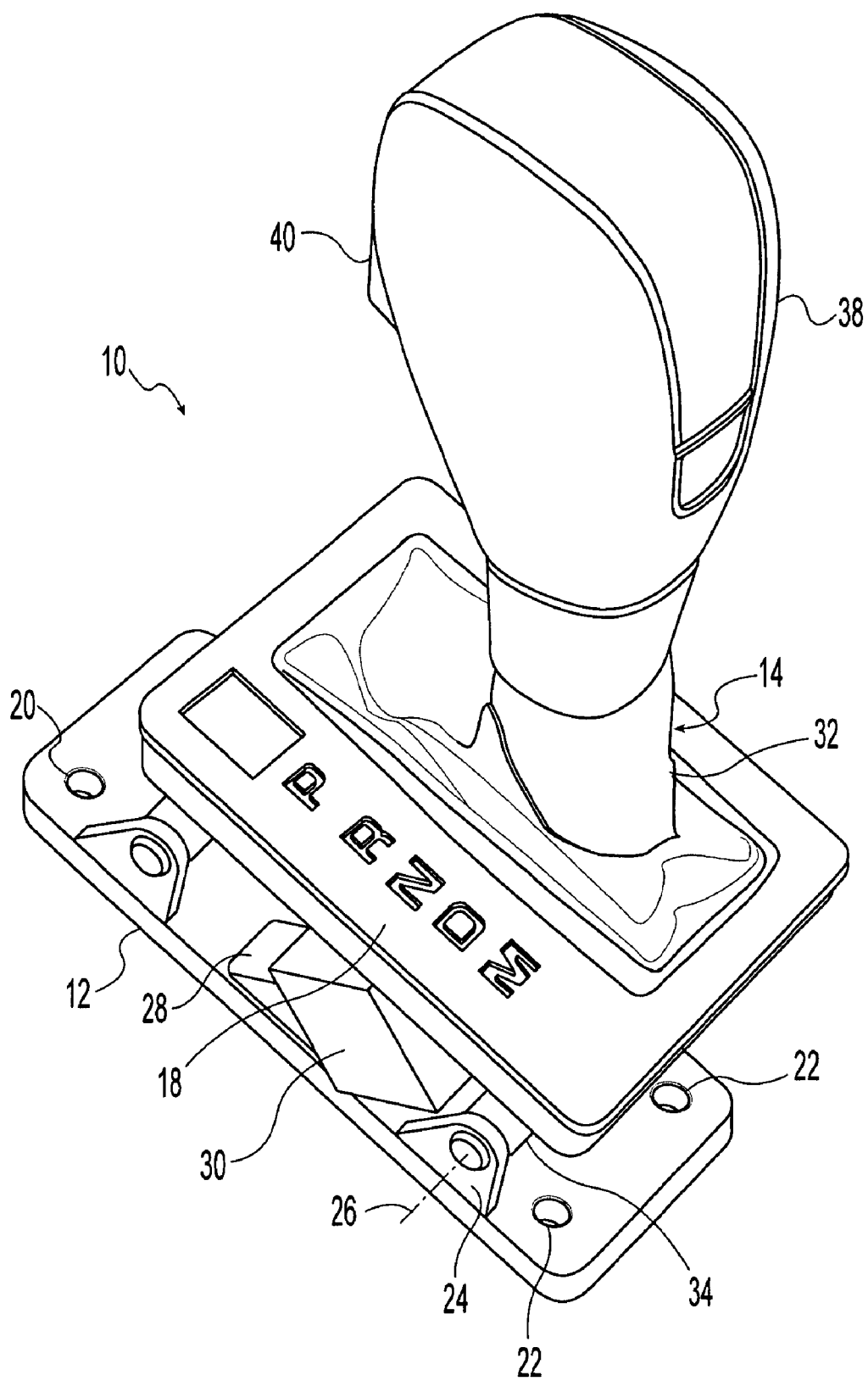
FIG. 1 is a perspective view of a shifter mechanism for a motor vehicle according to a preferred embodiment of the present invention.

It should be understood that the appended drawings are not necessarily to scale, presenting a somewhat simplified representation of various preferred features illustrative of the basic principles of the invention. The specific design features of an electronic shifter mechanism as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter lever mechanism illustrated in the drawings. In general, up or upward generally refers to an upward direction in FIG. 1 and down or downward generally refers to a downward direction in FIG. 1. Also in general, fore or forward refers to a direction toward the front of the vehicle, that is, generally toward the left in FIG. 1 and aft or rearward refers to a direction toward the rear of the vehicle, that is, generally toward the right in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved shifter lever mechanism disclosed herein. The following detailed discussion of various alternative and preferred embodiments will illustrate the general principles of the invention with reference to a particular electronic shifter mechanism for an automatic transmission of a motor vehicle such as an automobile, sport utility vehicle (SUV), or truck. Other embodiments suitable for other applications will be apparent to those skilled in the art given the benefit of this disclosure.

Figure 2:
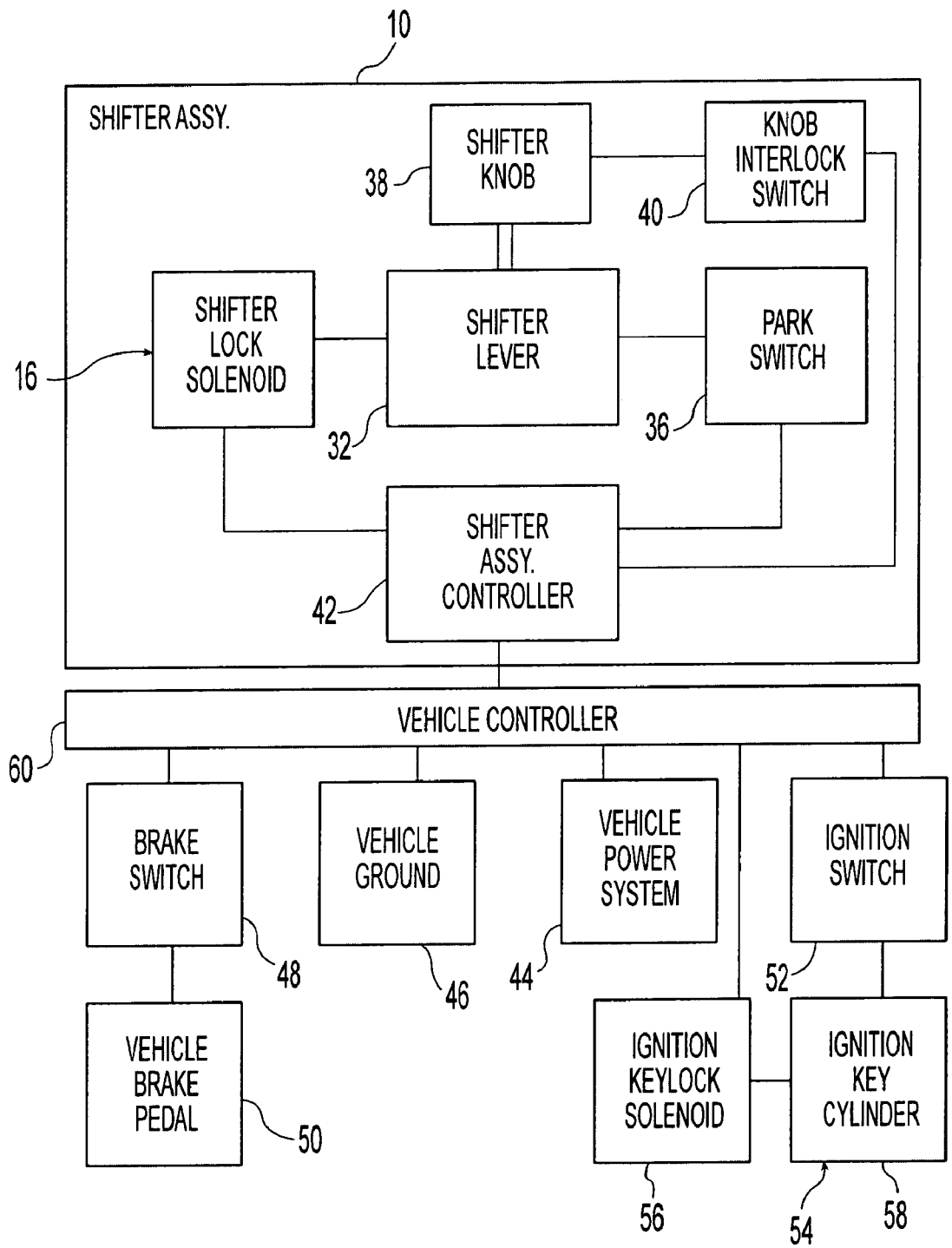
FIG. 2 is a diagrammatic view of the shifter mechanism of FIG. 1 showing electric connections to the motor vehicle.
Figures 3, 4:
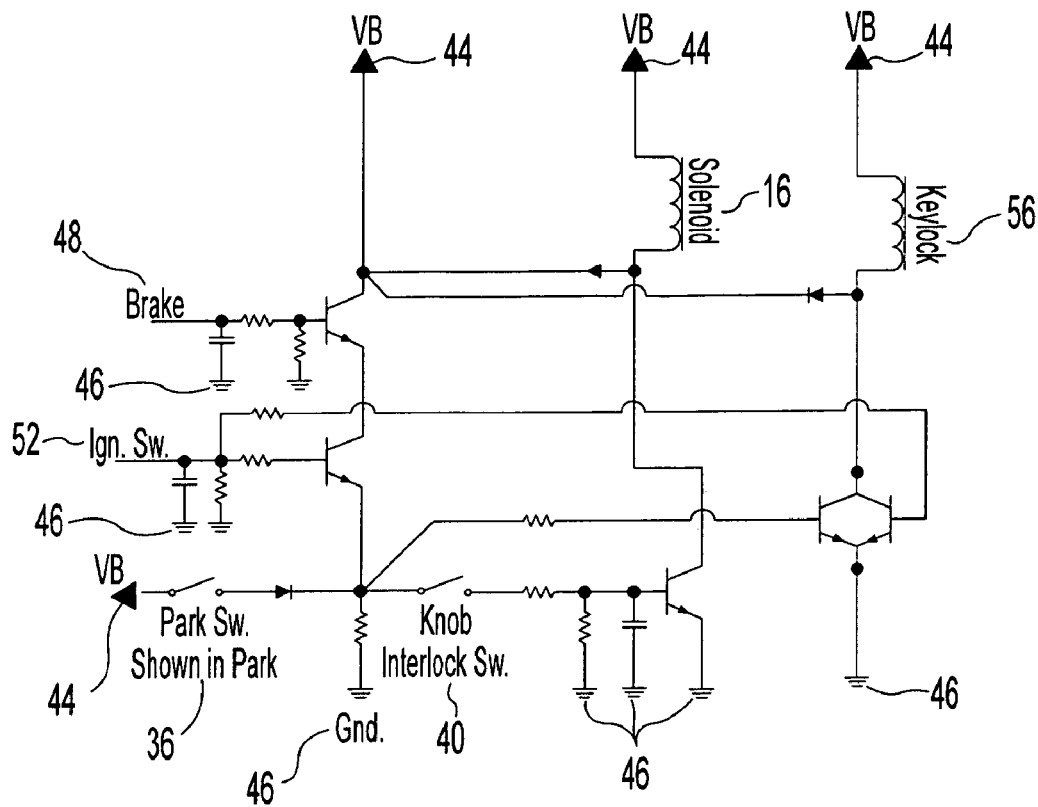
FIG. 3 is an electrical schematic of a controller of the shifter mechanism of FIGS. 1 and 2.
FIG. 4 is a logic table showing output signals of the controller of FIG. 3 resulting from different input signals.

Referring now to the drawings, FIGS. 1 to 3 show an electronic shifter mechanism 10 according to a preferred embodiment of the present invention. The illustrated shifter mechanism 10 includes a frame or base 12, a shifter lever assembly 14 pivotably mounted to the base 12, and a lock or detent assembly 16 releasably holding the shifter lever assembly 14 in a desired one of a plurality of gear positions 18 against undesired or inadvertent movement to the other gear positions 18. The illustrated shifter mechanism 10 includes the gear positions 18 of park (P), reverse (R), neutral (N), drive (D), and low gear (M) but an other suitable plurality of gear positions 18 can alternatively be utilized.

The base 12 is adapted to be attached to the motor vehicle in a fixed position such as a floor or console and can be formed of any suitable size and shape. The illustrated base 12 is generally planar and shaped to engage the motor vehicle in a desired manner. The forward end of the base 12 is provided with an opening or hole 20 for receiving a mechanical fastener such as bolts to secure the base 12 to the motor vehicle. The rearward end of the base 12 is provided with a pair of openings or holes 22 for receiving mechanical fasteners such as bolts to secure the base 12 to the motor vehicle. Other suitable shapes for the base 12 and the attachment means 20, 22 will be apparent to those skilled in the art. A pair of upwardly extending pivot flanges 24 are provided near the rear of the base 12 at lateral sides of the base 12. The pivot flanges 24 are laterally spaced apart and provided with coaxial openings for pivotably mounting the shifter lever assembly 14. The flange openings define a horizontal and laterally extending pivot axis 26 for the shifter lever assembly 14. A mounting block or bracket 28 is provided along the left side of the base 12. The mounting bracket 28 supports an electric actuator or solenoid 30 of the lock assembly 16. The illustrated shifter lock solenoid or actuator 30 is a linear actuator but any other suitable solenoid actuator can be utilized within the scope of the present invention.

The shifter lock solenoid 30 is configured to permit a spring to bias a lock pawl into engagement with the shifter lever assembly 14 to a locking position when the shifter lock solenoid 30 is unpowered and to selectively move a lock pawl out of engagement with the shifter lever assembly 14 to a nonlocking position when the shifter lock solenoid 30 is powered. The lock pawl is sized and shaped to block and limit pivotal movement of the shifter lever assembly 14 when the lock pawl in its locking position and to permit pivotal movement of the shifter lever assembly 14 between the gear positions 18 when the lock pawl is in its unlocking position. The shifter lever assembly 14 and the shifter lock assembly 16 can each be of any suitable configuration such as, for example, those disclosed in U S. patent application Ser. No. 10/812,664, the disclosure of which is expressly incorporated herein in its entirety.

The illustrated shifter lever assembly 14 includes a shifter post or lever 32 upwardly extending from a shifter yoke 34 for manually moving the shifter yoke 34 to change the gear of the transmission. The lower end of the shifter yoke 34 is sized and shaped to extend between the pivot flanges 24 of the base 12. A horizontal, laterally extending pivot pin cooperates with the flange openings to provide a pivotable connection between the shifter yoke and the base 12. Pivotably connected in this manner, the shifter yoke 34 is pivotable relative to the base 12 about the laterally extending pivot axis 26. The illustrated shifter level mechanism 10 includes a park switch 36 indicates when the shifter lever 32 is in or out of the park position. The illustrated park switch 36 is open or off when the shifter lever 32 is in the park position and is closed or on when the shifter lever 32 is not in the park position.

The illustrated shifter lever 32 is generally an elongate tube having a central axis and forming a hollow central passage for the passage of wires therethrough. The shifter lever 32 can be rigidly secured to the shifter yoke 34 in any suitable manner such as, for example, snap-connectors, welding, adhesives, or mechanical fasteners or the shifter lever can be formed unitary, that is as one piece, with the shifter yoke. With the shifter lever 32 rigidly secured to shifter yoke 34, the shifter yoke 34 can be selectively pivoted about the pivot axis 26 by manually applying a forward or rearward force to the shifter lever 32. The upper end of the shifter lever 32 is provided with handle or knob 38. The knob 38 is preferably provided with a shape to provide a suitable gripping surface for the hand of the operator. The illustrated knob 38 is provided with an operator input or knob interlock switch 40 which the user presses to selectively shift gear positions.

The illustrated shifter mechanism 10 includes a controller 42 that includes all of the shifter control logic that determines when shifting gears is permissible and when shifting gears is not permissible. The controller 42 is operably connected to the shifter lock solenoid 30 to power and unpower the shifter lock solenoid 30 as desired. The controller 42 is also operably connected to the knob interlock switch 40 to activate the shifter lock solenoid 30 under permissible conditions as described in more detail hereinafter. The controller 42 is further operably connected to the shifter park switch 36 to determine when the shifter lever 32 is in the park position.

The controller 42 is operatively connected to a power source such as the illustrated vehicle positive battery connection 44 (VB) and the vehicle negative battery connection 46 (GND). The controller 42 is also operatively connected to a vehicle brake switch 48 to receive an input signal which indicates when the vehicle brake pedal 50 is pressed or applied and when the vehicle brake pedal 50 is not pressed or unapplied. The illustrated input signal from the vehicle brake switch 48 is battery voltage when the vehicle brake pedal 50 is pressed and 0 volts when the vehicle brake pedal 50 is not pressed. The controller 42 is further operatively connected to a vehicle ignition switch 52 to receive an input signal which indicates when the vehicle ignition 54 is on and when the vehicle ignition 54 is off. The illustrated input signal from the vehicle ignition switch 52 is battery voltage when the vehicle ignition 54 is on and 0 volts when the vehicle ignition 54 is off.

The illustrated controller 54 also includes all of the control logic that determines when a vehicle key lock solenoid 56 should be activated to lock a key within the vehicle ignition key cylinder 58 so that the key cannot be removed from the vehicle ignition key cylinder 58 and should be deactivated so that the key can be removed from the vehicle ignition key cylinder 58. The controller 54 is operably connected to the vehicle key lock solenoid 56 to power and unpower the vehicle key lock solenoid 56 as desired.

Figure 5:
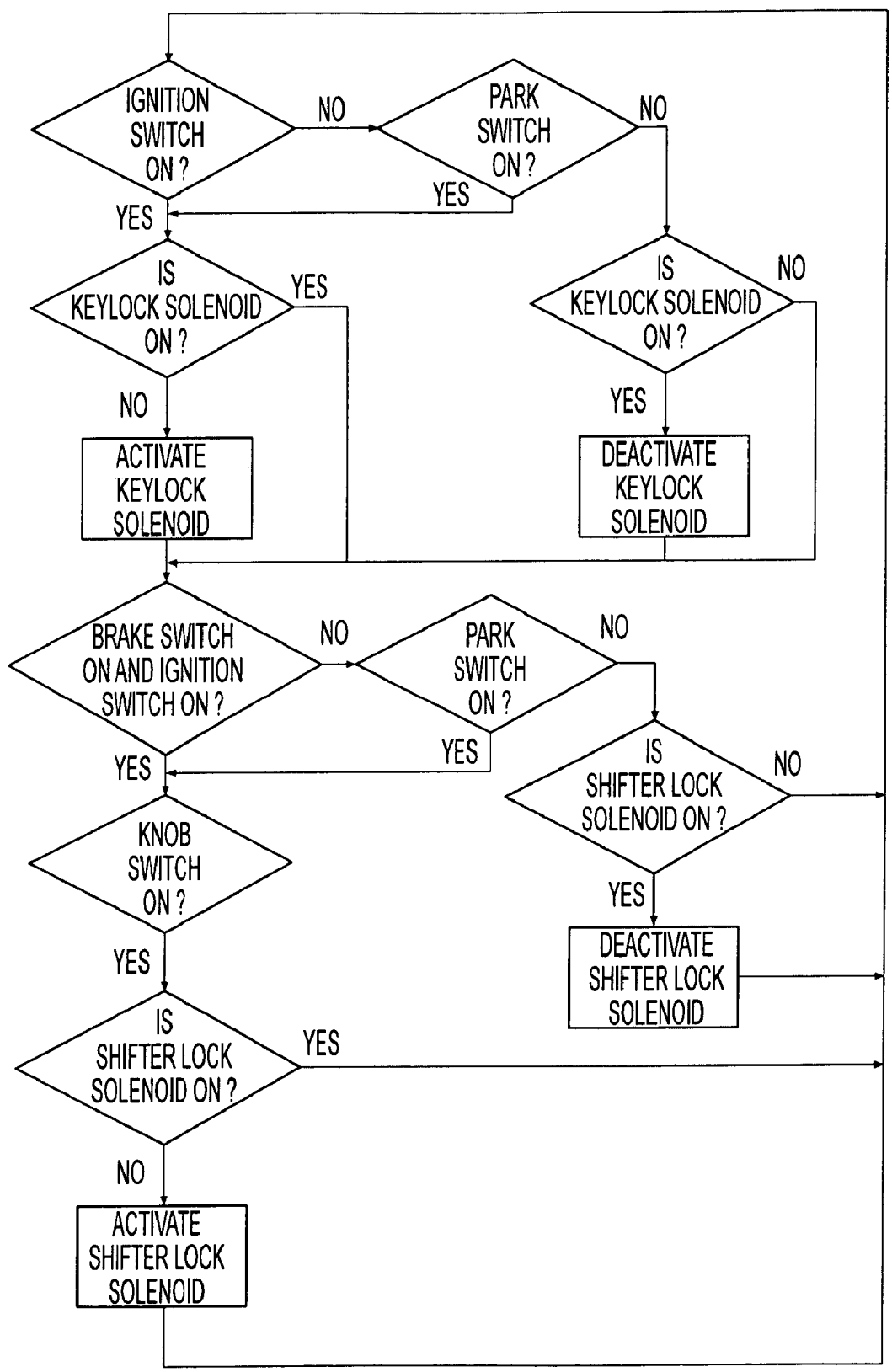
FIG. 5 is a diagrammatic view showing operation of the controller of FIGS. 3 and 4.

As best shown in FIGS. 3 to 5, the controller 42 is configured to activate the vehicle key lock solenoid 56 to lock the key in the vehicle ignition key cylinder 58 so that the vehicle operator cannot remove the key when the controller 42 receives an input signal from the vehicle ignition switch 52 indicating that the vehicle ignition 54 is on. The controller 42 is also configured to activate the key lock solenoid 56 to lock the key in the vehicle ignition key cylinder 58 so that the vehicle operator cannot remove the key when the controller 42 receives an input signal from the shifter park switch 36 indicating that the shifter lever 32 is not in the park position, that is, that the shifter park switch 36 is on. Thus, the vehicle key lock solenoid 56 is activated by the controller 42 whenever the vehicle ignition switch 52 is on and/or the shifter park switch 36 is on. It is noted that when neither of these conditions are present, the controller 42 deactivates the vehicle key lock solenoid 56 to unlock the key in the vehicle ignition key cylinder 58 so that the operator is free to remove the key.

The illustrated controller 42 is also configured to activate the shifter lock solenoid 30 and unlock the shifter lever 32 so that the vehicle operator can switch gear positions when the controller 42 receives: (1) an input signal from the vehicle ignition switch 52 indicating that the vehicle ignition 54 is on, that is, that the vehicle ignition switch 52 is on; (2) an input signal indication from the vehicle brake switch 48 indicating that the vehicle brake pedal 50 is pressed, that is, the vehicle brake switch 48 is on; and (3) an input signal from the shifter knob interlock switch 40 indicating that the vehicle operator has depressed the shifter knob interlock switch 40, that is, that the shifter knob interlock switch 40 is on. In the illustrated embodiment, the shifter knob interlock switch 40 is enabled to trigger the shifter lock solenoid 30 upon activation when input signals from the vehicle ignition switch 52 and the vehicle brake switch 48 are both at battery voltage. When the knob interlock switch 40 is enabled, the transistor connected to the negative lead of the shifter lock solenoid 30 is turned on which activates the shifter lock solenoid 30 to unlock the shifter lever 32.

The illustrated controller 42 is also configured to activate the shifter lock solenoid 30 and unlock the shifter lever 32 so that the vehicle operator can switch gear positions when the controller 42 receives: (1) an input signal from the shifter park switch 36 indicating that the shifter lever 32 is not in park, that is, that the shifter park switch 36 is on; and (2) an input signal from the shifter knob interlock switch 40 indicating that the vehicle operator has depressed the shifter knob interlock switch 40, that is, that the shifter knob interlock switch 40 is on. In the illustrated embodiment, the shifter knob interlock switch 40 is enabled to trigger the shifter lock solenoid 30 upon activation when an input signal from the shifter park switch 36 is at battery voltage. When the knob interlock switch 40 is enabled, the transistor connected to the negative lead of the shifter lock solenoid 30 is turned on which activates the shifter lock solenoid 30 to unlock the shifter lever 32. It is noted that under all other conditions, the controller 42 prevents the shifter lock solenoid 30 from activating to prevent the shifter lever 32 from moving to a different gear position 18.

It is apparent from the above detailed description of the present invention, that the illustrated shifter mechanism 10 combines all shifter control circuits into one controller 42 which controls both the shifter lock solenoid 30 and the vehicle key lock solenoid 56. Thus, the vehicle electronics or controller 60 do(es) not have to determine when shifting gears is permissible. With the shifter controller 42 controlling shifter lock solenoid 30 conditions, cables between the shifter mechanism 10 and the vehicle brake pedal 50 can be cost reduced and/or eliminated. With the shifter controller 42 controlling the vehicle ignition key lock solenoid 56 conditions, cables between the shifter mechanism 10 and the vehicle ignition 54 can be cost reduced and/or eliminated.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A shifter mechanism for a motor vehicle comprising, in combination:

a shifter lever movable along a shift path between a plurality of gear positions including a park position;

a park switch providing a signal indicating when the shifter lever is out of the park position;

wherein the park switch is on when the shifter lever is not in the park position;

a lock assembly including an electric actuator movable between a locking position wherein the shifter lever is locked in one of the plurality of gear positions and an unlocking position wherein the shifter lever is movable along the shift path between the plurality of gear positions;

a manually-actuated interlock switch providing a signal indicating the vehicle operator desires to move the shifter lever between the plurality of gear positions;

a controller operably connected to the park switch to receive the signal from the park switch, operably connected to the interlock switch to receive the signal from the interlock switch, and operably connected to the electric actuator to selectively actuate the electric actuator;

wherein the controller is adapted to receive an input signal from a vehicle ignition switch indicating whether a vehicle ignition is on and an input signal from a vehicle brake switch indicating whether a vehicle brake pedal is pressed;

wherein the controller moves the actuator to the unlocking position when the input signal from the vehicle ignition switch indicates the vehicle ignition is on, the input signal from the vehicle brake switch indicates that the vehicle brake pedal is pressed, and the signal from the interlock switch indicates that the vehicle operator has actuated the interlock switch; and wherein the controller moves the actuator to the unlocking position when the signal from the park switch indicates that the shifter lever is not in the park position and the input signal from the interlock switch indicates that the vehicle operator has actuated the interlock switch.

2. The shifter system according to claim 1, wherein the electric actuator is an electric linear solenoid.

3. The shifter system according to claim 1, wherein the controller includes all control circuits used to control the electric actuator.

4. The shifter system according to claim 1, wherein the input signal from the vehicle ignition switch is vehicle battery voltage when the vehicle ignition is on and is 0 volts when the vehicle ignition is off.

5. The shifter system according to claim 4, wherein the input signal from the vehicle brake switch is vehicle battery voltage when the vehicle brake pedal is pressed and is 0 volts when the vehicle brake pedal is not pressed.

6. The shifter system according to claim 5, wherein the interlock switch is enabled when the input signal from the vehicle brake switch and the input signal from the vehicle ignition switch are each at battery voltage.

7. The shifter system according to claim 1, wherein the input signal from the vehicle ignition switch is vehicle battery voltage when the vehicle brake pedal is pressed and is 0 volts when the vehicle brake pedal is not pressed.

8. The shifter system according to claim 1, wherein the controller actuates a vehicle key lock actuator when the input signal from the vehicle ignition switch indicates the vehicle ignition is on, and the controller actuates the vehicle key lock actuator when the signal from the park switch indicates that the shifter lever is not in the park position.

9. The shifter system according to claim 8, wherein the controller includes all control circuits used to control the vehicle key lock actuator.

10. A shifter mechanism for a motor vehicle comprising, in combination:

a shifter lever movable along a shift path between a plurality of gear positions including a park position;

a park switch providing a signal indicating when the shifter lever is out of the park position;

wherein the park switch is on when the shifter lever is not in the park position;

a lock assembly including an electric actuator movable between a locking position wherein the shifter lever is locked in one of the plurality of gear positions and an unlocking position wherein the shifter lever is movable along the shift path between the plurality of gear positions;

a manually-actuated interlock switch providing a signal indicating the vehicle operator desires to move the shifter lever between the plurality of gear positions;

a controller operably connected to the park switch to receive the signal from the park switch, operably connected to the interlock switch to receive the signal from the interlock switch, and operably connected to the electric actuator to selectively actuate the electric actuator;

wherein the controller is adapted to receive an input signal from a vehicle ignition switch indicating whether a vehicle ignition is on;

wherein the controller actuates a vehicle key lock actuator when the input signal from the vehicle ignition switch indicates the vehicle ignition is on; and the controller actuates the vehicle key lock actuator when the signal from the park switch indicates that the shifter lever is not in the park position.

11. The shifter system according to claim 10, wherein the controller includes all control circuits used to control the vehicle key lock actuator.

12. The shifter system according to claim 10, wherein the electric actuator is an electric linear solenoid.

13. The shifter system according to claim 10, wherein the controller includes all control circuits used to control the electric actuator.

14. The shifter system according to claim 10, wherein the input signal from the vehicle ignition switch is vehicle battery voltage when the vehicle ignition is on and is 0 volts when the vehicle ignition is off.

15. The shifter system according to claim 10, wherein the controller is adapted to receive an input signal from a vehicle brake switch indicating whether a vehicle brake pedal is pressed, wherein the controller moves the actuator to the unlocking position when the input signal from the vehicle ignition switch indicates the vehicle ignition is on, the input signal from the vehicle brake switch indicates that the vehicle brake pedal is pressed, and the signal from the interlock switch indicates that the vehicle operator has actuated the interlock switch; and wherein the controller moves the actuator to the unlocking position when the signal from the park switch indicates that the shifter lever is not in the park position and the input signal from the interlock switch indicates that the vehicle operator has actuated the interlock switch.

16. The shifter system according to claim 15, wherein the input signal from the vehicle brake switch is vehicle battery voltage when the vehicle brake pedal is pressed and is 0 volts when the vehicle brake pedal is not pressed.

17. The shifter system according to claim 16, wherein the input signal from the vehicle brake switch is vehicle battery voltage when the vehicle brake pedal is pressed and is 0 volts when the vehicle brake pedal is not pressed, and wherein the interlock switch is enabled when the input signal from the vehicle brake switch and the input signal from the vehicle ignition switch are each at battery voltage.

18. A shifter mechanism for a motor vehicle comprising, in combination:

a shifter lever movable along a shift path between a plurality of gear positions including a park position;

a park switch providing a signal indicating when the shifter lever is out of the park position;

wherein the park switch is on when the shifter lever is not in the park position;

a lock assembly including an electric actuator movable between a locking position wherein the shifter lever is locked in one of the plurality of gear positions and an unlocking position wherein the shifter lever is movable along the shift path between the plurality of gear positions;

a manually-actuated interlock switch providing a signal indicating the vehicle operator desires to move the shifter lever between the plurality of gear positions;

a controller operably connected to the park switch to receive the signal from the park switch, operably connected to the interlock switch to receive the signal from the interlock switch, and operably connected to the electric actuator to selectively actuate the electric actuator;

wherein the controller is adapted to receive an input signal from a vehicle ignition switch indicating whether a vehicle ignition is on and an input signal from a vehicle brake switch indicating whether a vehicle brake pedal is pressed;

wherein the controller moves the actuator to the unlocking position when the input signal from the vehicle ignition switch indicates the vehicle ignition is on, the input signal from the vehicle brake switch indicates that the vehicle brake pedal is pressed, and the signal from the interlock switch indicates that the vehicle operator has actuated the interlock switch;

wherein the controller moves the actuator to the unlocking position when the signal from the park switch indicates that the shifter lever is not in the park position and the input signal from the interlock switch indicates that the vehicle operator has actuated the interlock switch;

wherein the controller actuates a vehicle key lock actuator when the input signal from the vehicle ignition switch indicates the vehicle ignition is on, and the controller actuates the vehicle key lock actuator when the signal from the park switch indicates that the shifter lever is not in the park position; and wherein the controller includes all control circuits used to control both the electric actuator and the vehicle key lock actuator.

* * * * *